(12) United States Patent
D'Errico

(10) Patent No.: US 7,279,516 B2
(45) Date of Patent: Oct. 9, 2007

(54) POLYMER SHEETS COMPRISING HIGHER ORDER PHOSPHATE ESTERS

(75) Inventor: John Joseph D'Errico, Glastonbury, CT (US)

(73) Assignee: Solutia Incorporated, St. Louis, MO (US)

( * ) Notice: Subject to any disclaimer, the term of this patent is extended or adjusted under 35 U.S.C. 154(b) by 479 days.

(21) Appl. No.: 10/978,730

(22) Filed: Nov. 2, 2004

(65) Prior Publication Data

US 2006/0094803 A1 May 4, 2006

(51) Int. Cl.
*C08K 5/523* (2006.01)
*B32B 17/10* (2006.01)

(52) U.S. Cl. ............... 524/127; 524/140; 524/141; 524/143; 428/437; 428/920; 428/921

(58) Field of Classification Search ........ 524/140–141, 524/127, 143; 428/437, 920–921
See application file for complete search history.

(56) References Cited

U.S. PATENT DOCUMENTS

| | | | |
|---|---|---|---|
| 2,430,053 A | 11/1947 | Hershberger | |
| 3,132,123 A | 5/1964 | Harris | |
| 3,235,537 A | 2/1966 | Albin | |
| 3,282,712 A | 11/1966 | Tashiro | |
| 3,388,033 A | 6/1968 | Buckley | |
| 3,528,954 A | 9/1970 | Carlson | |
| 3,539,442 A | 11/1970 | Buckley | |
| 3,635,926 A | 1/1972 | Gresham | |
| 3,642,742 A | 2/1972 | Carlson | |
| 3,723,320 A | 3/1973 | Herber | |
| 3,841,890 A | 10/1974 | Coaker | |
| 4,029,868 A | 6/1977 | Carlson | |
| 4,206,067 A | 6/1980 | MacKinnon | |
| 4,485,601 A | 12/1984 | De Boel | |
| 4,623,592 A | 11/1986 | Daude | |
| 4,654,268 A | 3/1987 | De Boel | |
| 4,681,810 A | 7/1987 | Gomez | |
| 4,704,418 A | 11/1987 | Gomez | |
| 4,707,304 A | 11/1987 | Gomez | |
| 4,945,015 A | 7/1990 | Milner | |
| 5,239,406 A | 8/1993 | Lynam | |
| RE34,523 E | 1/1994 | Daude | |
| 5,434,006 A | 7/1995 | Goelff | |
| 5,523,877 A | 6/1996 | Lynam | |
| 5,604,626 A | 2/1997 | Teowee | |
| 5,631,315 A | 5/1997 | D'Errico | |
| 5,838,483 A | 11/1998 | Teowee | |
| 5,864,419 A | 1/1999 | Lynam | |
| 5,908,704 A | 6/1999 | Friedman | |
| 5,952,408 A | 9/1999 | Lee | |
| 5,986,797 A | 11/1999 | Lynam | |
| 6,083,428 A | 7/2000 | Ueda | |
| 6,122,093 A | 9/2000 | Lynam | |
| 6,178,034 B1 | 1/2001 | Allemand | |
| 6,246,505 B1 | 6/2001 | Teowee | |
| 6,726,979 B2 | 4/2004 | Friedman | |
| 6,797,396 B1 | 9/2004 | Liu et al. | |
| 7,115,677 B2 * | 10/2006 | Harashina et al. | 523/205 |
| 2002/0041424 A1 | 4/2002 | Lynam | |
| 2002/0151632 A1 | 10/2002 | Tarnawskyj | |
| 2003/0162028 A1 | 8/2003 | Friedman | |
| 2004/0004778 A1 | 1/2004 | Liu | |
| 2005/0249911 A1 * | 11/2005 | Randall et al. | 428/85 |

FOREIGN PATENT DOCUMENTS

| | | | |
|---|---|---|---|
| GB | 828381 | * | 2/1960 |
| GB | 1033322 | | 6/1966 |
| GB | 1110377 A | | 10/1966 |
| WO | WO 03/033583 A1 | | 4/2003 |

* cited by examiner

*Primary Examiner*—Peter Szekely
(74) *Attorney, Agent, or Firm*—Brenc Law

(57) ABSTRACT

The present invention is in the field of polymer sheets for use in multiple layer glass panels, and more specifically, the present invention is in the field of polymer sheets comprising agents that improve fire resistance in the polymer sheets.

31 Claims, No Drawings

POLYMER SHEETS COMPRISING HIGHER ORDER PHOSPHATE ESTERS

FIELD OF THE INVENTION

The present invention is in the field of polymer sheets for use in multiple layer glass panels, and more specifically, the present invention is in the field of polymer sheets comprising agents that improve fire resistance in the polymer sheets.

BACKGROUND

Poly(vinyl butyral) (PVB) is commonly used in the manufacture of polymer sheets that can be used as interlayers in light-transmitting laminates such as safety glass or polymeric laminates. Safety glass typically refers to a transparent laminate comprising a poly(vinyl butyral) sheet disposed between two panes of glass. Safety glass often is used to provide a transparent barrier in architectural and automotive openings. Its main function is to absorb energy, such as that caused by a blow from an object, without allowing penetration through the opening.

Safety glass can be formed by a process in which two layers of glass and a plastic interlayer, such as poly(vinyl butyral), are assembled into a pre-press, tacked into a pre-laminate, and finished into an optically clear laminate. The assembly phase can involve laying down a piece of glass, overlaying a poly(vinyl butyral) sheet on that glass, laying down a second piece of glass on the poly(vinyl butyral) sheet, and then trimming the excess poly(vinyl butyral) to the edges of the glass layers.

The plastic interlayer can be produced by mixing poly(vinyl butyral) polymer with one or more plasticizers, and optionally with one or more other ingredients, and melt processing the mix into sheeting, which can be collected and rolled for storage and transportation.

In addition to various common uses for laminated glass structures having a conventional polymer sheet type interlayer, in some applications of laminated safety glass it is particularly desirable to have additional fire retardation features. Examples of attempts to include some measure of fire retardation include the inclusion of additional layers of intumescent material that are specifically designed to char when subjected to flames, thereby preventing the further spread of a fire through the charred layer (U.S. Pat. No. 4,485,601). Additional protection, however, is often desirable.

Accordingly, there is a need in the art for polymer compositions that provide the desired fire resistance while also allowing for the facile manufacture of a polymer sheet without adversely affecting other desirable properties.

SUMMARY OF THE INVENTION

Now, according to the present invention, it has surprisingly been discovered that various thermoplastic polymers incorporating phosphate ester agents can improve the fire resistant character of polymer sheets that are useful as interlayers in multiple layer glass panels such as those used in architectural and automotive applications.

The present invention includes a multiple layer glass panel interlayer, comprising: a polymer sheet comprising a thermoplastic polymer and a polyphosphate ester plasticizer.

The present invention includes a multiple layer glass panel, comprising: an interlayer, wherein said interlayer comprises a polymer sheet comprising a thermoplastic polymer and a polyphosphate ester plasticizer.

The present invention includes a method of manufacturing a multiple layer glass panel interlayer, comprising: forming a polymer sheet comprising a thermoplastic polymer and a polyphosphate ester plasticizer.

DETAILED DESCRIPTION

According to the present invention, it has surprisingly been discovered that incorporation of higher order phosphate ester plasticizers in polymer sheets that are used in multiple layer glass panels not only imparts improved fire retardation relative to panels that lack such an agent, but also allows the production of such phosphate ester plasticized sheets using methods and devices that are currently used for production of polymer sheets lacking higher order phosphate ester plasticizers. As will be described in more detail below, a "polymer sheet" can comprise any suitable thermoplastic polymer, for example, poly(vinyl butyral). Further, as will be described in more detail below, many higher order phosphate ester plasticizers can be used to achieve the desired fire retardant properties.

Further agents can be included, as detailed below, for various purposes other than to plasticize the polymer, for example, adhesion control agents and infrared absorbing agents can be added. In various embodiments, one or more acid scavenger agents, which are described in detail below, can be added to the polymer sheet to impart additional stability.

In various embodiments of the present invention, an interlayer comprises a polymer sheet comprising a higher order phosphate ester plasticizer, or a mixture of 2 or more higher order phosphate ester plasticizers. As used herein, a higher order phosphate ester is any phosphate ester having more than one phosphate group, which can also be described as a polyphosphate ester. In various embodiments, the polyphosphate ester is a diphosphate ester. In various embodiments, the polyphosphate ester is an oligomeric diphosphate ester.

In various embodiments, a polymer sheet of the present invention comprises a polyphosphate ester having the following structure:

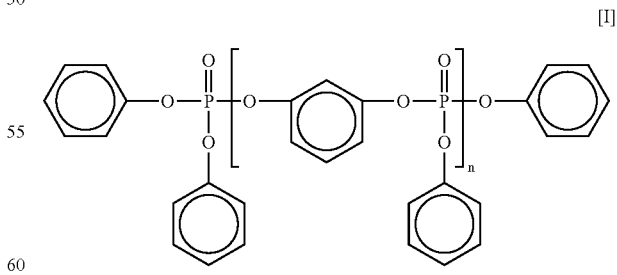

[I]

wherein n is 1 to 7. In various embodiments, n is 1.

In various embodiments, a polymer sheet of the present invention comprises a polyphosphate ester having the following structure:

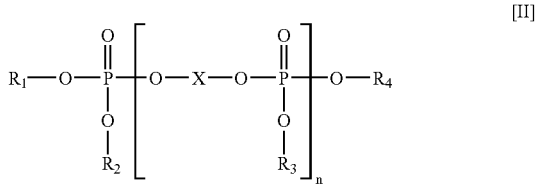

wherein $R_1$, $R_2$, $R_3$, $R_4$, and X can be, independent of each other, an aryl group, an alkyl group, a $C_6$ to $C_{20}$ aryl or alkyl-substituted $C_6$ to $C_{20}$ aryl and n is 1 to 5. In various embodiments, n is 1.

In various embodiments, a polymer sheet of the present invention comprises a polyphosphate ester having structure II, wherein $R_1$, $R_2$, $R_3$, $R_4$, can be, independent of each other, an aryl group, an alkyl group, a $C_6$ to $C_{20}$ aryl or alkyl-substituted $C_6$ to $C_{20}$ aryl, X can be an aryl group, an alkyl group, a $C_6$ to $C_{20}$ aryl or alkyl-substituted $C_6$ to $C_{20}$ aryl, ethylene glycol, propylene glycol, or a polyester, and n is 1 to 5. In various embodiments, n is 1.

In various embodiments, a polymer sheet of the present invention comprises a polyphosphate ester having structure II, wherein $R_1$, $R_2$, $R_3$, and $R_4$ can be, independent of each other, a phenyl group or a xylyl group with at least one being a phenyl group and one being a xylyl group, n is 1 to 5, and X has the structure:

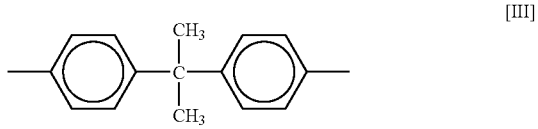

Specific examples of polyphosphate esters that are useful in the polymer sheets of the present invention include, without limitation, polyphosphate ester having an aromatic ring such as hydroquinone bis(diphenyl phosphate), hydroquinone bis(dicresyl phosphate), hydroquinone bis(dixylyl phosphate), diphenol bis(dixylyl phosphate), resorcinol bis(diphenyl phosphate), resorcinol bis(dicresyl phosphate), resorcinol bis(dixylyl phosphate), bisphenol-A bis(diphenyl phosphate), bisphenol-A bis(dicresyl phosphate), bisphenol-A bis(dixylyl phosphate), and mixtures thereof.

In various embodiments of the present invention, higher order phosphate esters can be used as a plasticizer in a polymer sheet at concentrations, for example, of 5-80 phr, 10-70 phr, 15-60 phr, or 20-50 phr. As indicated above, total plasticizer content can comprise two or more higher order phosphate esters.

In other embodiments, higher order phosphate esters are used in combination with conventional plasticizers to form a plasticizer mix. In these combinations, the total plasticizer content can be 5-80 phr, 10-70 phr, 15-60 phr, or 20-50 phr, and the higher order phosphate ester can comprise at least 10%, 20%, 30%, 40%, 50%, or 75% of the plasticizer mix on a weight per weight basis. Conventional plasticizers that can be used with the higher order phosphate ester plasticizers of the present invention include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779. and $C_6$ to $C_8$ adipate esters, such as hexyl adipate. In some embodiments, the plasticizer is triethylene glycol di-(2-ethylhexanoate).

In further embodiments, higher order phosphate esters can be combined with a monomeric phosphate ester (a phosphate ester having one phosphate group) plasticizer, examples of which are provided elsewhere herein, and optionally may contain a conventional plasticizer, to produce a mixed plasticizer. In these combinations, the total plasticizer content can be 5-80 phr, 10-70 phr, 15-60 phr, or 20-50 phr, and the higher order phosphate ester can comprise at least 10%, 20%, 30%, 40%, 50%, or 75% of the plasticizer mix on a weight per weight basis.

Monomeric phosphate esters that can be used in plasticizer blends of the polymer sheets of the present invention include monomeric phosphate esters having the formula

wherein R is selected from the group consisting of aryl, alkaryl wherein the alkyl group contains from 1 to 3 carbon atoms, alkyl of from 1 to 12 carbon atoms, alkoxyalkyl of from 1 to 9 carbon atoms and cycloalkyl, with the proviso that when all of the radicals represented by R in a given compound are alkyl radicals, it is preferred that each alkyl radical has 4 or more carbon atoms. It is possible for R to represent different radicals in the same phosphate ester plasticizer.

Examples of suitable phosphate esters include tri-n-butyl phosphate, triisobutyl phosphate, triphenyl phosphate, tricresyl phosphate, tri-2,3-xylyl phosphate, trimesityl phosphate, methyl diphenyl phosphate, dimethyl phenylphosphate, ethyl di-cresyl phosphate, tripentyl phosphate, trihexyl phosphate, pentyl dihexyl phosphate, octyl diphenyl phosphate, trioctyl phosphate, octyl di-p-cresyl phosphate, tri-cyclohexyl phosphate, cyclohexyl diphenyl phosphate, dicyclohexyl phenyl phosphate, trinonyl phosphate, hexyl phenyl cresyl phosphate, 2-methylpentyl phenyl cresyl phosphate, octylphenyl cresyl phosphate, 2-ethylhexyl phenyl cresyl phosphate, n-octyl phenyl cresyl phosphate, nonyl phenyl cresyl phosphate, n-decyl phenyl cresyl phosphate, lauryl phenyl cresyl phosphate, butoxyethyl phenyl cresyl phosphate, 2-methylpentoxyethyl phenyl cresyl phosphate, hexoxyethyl phenyl cresylphosphate, octoxyethyl phenyl cresyl phosphate, 2-ethylhexyloxyethyl phenyl cresyl phosphate, nonyloxyethyl phenyl cresyl phosphate, decyloxyethyl phenyl cresyl phosphate, lauroxyethyl phenyl cresylphosphate, hexyl dicresyl phosphate, 2-ethylbutyl diphenyl phosphate, 2-methylpentyl dicresyl phosphate, n-hexyl diphenyl phosphate, octyl dicresyl phosphate, 2-ethylhexyl-dicresyl phosphate, iso-octyl dicresyl phosphate, n-octyl diphenyl phosphate, 2-ethylhexyl diphenyl phosphate, iso-octyl diphenyl phosphate, nonyl diphenyl phosphate, trimethylhexyl diphenyl phosphate, nonyl dicresyl phosphate, n-decyl diphenyl phosphate, decyl dicresyl phosphate, lauryl diphenyl phosphate, dodecyl dicresyl phosphate, 2-ethylhexyl methyl phenyl phosphate, 2-ethylhexyl iso-butyl-p-chlorophenyl phosphate, n-octyl n-butyl phenyl phosphate, 2-ethylhexyl isobutylphenyl phosphate, 2-ethylhexyl n-butyl phenyl phosphate, 2-ethylhexyl sec-butyl cresyl phosphate, 2-ethylhexyl n-butyl cresyl phosphate, di(2-ethylhexyl) phenyl phosphate, 2-ethylhexyl capryl phenyl phosphate, 2-ethylhexyl 2butyloctyl cresyl phosphate, n-butyl sec-tetradecyl phenyl phosphate, n-hexadecyl isopropyl phenyl phosphate, dodecyldiphenyl phosphate, tri-2-ethylhexyl phosphate, cresyl diphenyl phosphate, and mixtures of the foregoing, among others.

The preferred monomeric phosphate esters are those that contain from 12 to 30 carbon atoms. Examples of these are trioctyl phosphate (especially tri-2-ethylhexyl phosphate), 2-ethylhexyl diphenyl phosphate, tricresyl phosphate, dodecyldiphenyl phosphate, tri-butoxyethyl phosphate and cresyl diphenyl phosphate.

For embodiments in which a polymer sheet comprises poly(vinyl butyral), poly(vinyl butyral) having a residual poly(vinyl alcohol) content, by weight, of 5% to 50%, 10% to 50%, 11% to 40%, 15% to 30%, or 20% to 30%, can be used, although other ranges can be used as well. It is also advantageous in some applications to use poly(vinyl butyral) having a residual poly(vinyl alcohol) content, by weight, of greater than 25%, greater than 27%, or greater than 30%.

A polymer sheet of the present invention that comprises a higher order phosphate ester can be used in embodiments in which a single polymer sheet is disposed between two glazing panels, for example glass, to form a three layer multiple layer panel.

Additionally, multiple polymer sheets can be combined to form an interlayer having two or more polymer sheets disposed between two glazing panels. In these embodiments, the polymer sheets can have the same composition or a different composition, and one or more sheets can comprise a higher order phosphate ester plasticizer of the present invention.

In still other embodiments, a polymer film comprising a suitable thermoplastic film, which will be described more fully below, can be incorporated between two polymer sheets, at least one of which is a polymer sheet comprising a higher order phosphate ester plasticizer of the present invention. Further embodiments in which additional polymer sheets and/or polymer films are included in a multiple layer panel interlayer of the present invention are within the scope of the present invention.

In yet other embodiments, any of the polymer sheets of the present invention can be utilized in a "bilayer" construction. Such bilayer constructions typically comprise a glazing sheet, such as a pane of glass, a polymer sheet, and a polymer film, in that order. This construction, which lacks a second pane of glass, allows for a panel with lower overall thickness and weight.

As used herein, a "fire resistant panel" is any of the glass//polymer layer(s)//glass constructs of the present invention that have at least one polymer sheet comprising a higher order phosphate ester plasticizer. In various embodiments of the present invention, further conventional non-fire resistant layers, and, as described elsewhere herein, fire resistant layers, can be added to any fire resistant panels of the present invention.

In various embodiments of the present invention, an additional fire resistant layer can be disposed on the outside surface of a layer of glass in any of the fire resistant panels described herein. For example, a glass//polymer sheet//glass construct with a higher order phosphate ester plasticizer in the polymer sheet can include a further fire resistant layer on either exposed glass surface to yield a multiple layer glass panel with the following structure: glass//polymer sheet//glass//fire resistant layer. A further glass layer can be included, and, optionally, further fire resistant layer//glass layer iterations to form various fire resistant multiple layer glass panels, according to the following:

fire resistant panel//(fire resistant layer//glass layer)$_n$, where n is a whole number less than 10, the fire resistant panel is any fire resistant panel of the present invention, and the fire resistant layer in each n iteration can be any fire resistant layer described herein, wherein the fire resistant layers represented by n can be the same or different. In various embodiments, the fire resistant layer can comprise any of the polymer sheets having higher order phosphate ester plasticizers and mixtures comprising higher order phosphate ester plasticizers as disclosed herein, monomeric phosphate ester plasticizers, intumescent layers, and fluoropolymers layers, as described herein.

In further embodiments of the present invention in which a higher order phosphate ester plasticizer is used as the only plasticizer in a polymer sheet, one or more layers of intumescent material can be added to form multiple layer glass panels having additional fire retardant characteristics. These embodiments can be formed, for example, by adding a layer of intumescent material and a layer of glass to any of the above described embodiments for a multiple layer glass panel comprising a polymer sheet comprising a higher order phosphate ester plasticizer. For example, one possible configuration is: glass//polymer sheet//glass//intumescent layer//glass. Of course more than one layer of intumescent material can be added, with additional vitreous layers incorporated as needed to separate the intumescent layers. Generally, a panel can be constructed with multiple intumescent layers having the design:

(glass panel comprising polymer sheet with a higher order phosphate ester) //(intumescent layer//glass layer)$_n$, where n is a whole number less than 10.

The intumescent layers of the present invention can be manufactured and incorporated according to known techniques, and specifically by those described in U.S. Pat. Nos. 4,654,268; 4,485,601; and 5,434,006. The material used as the intumescent material can be any suitable material, including, but not limited to, hydrated metal salts, metal silicates, alkali metal silicates, and hydrated sodium silicate. In various embodiments the intumescent material is hydrated sodium silicate. In various embodiments, the hydrated sodium silicate has a weight ratio $SiO_2:N_2O$ of between about 3:1 and 4:1 or about 3.4:1, and can have, for example, from 25 to 40 or from 30 to 35 water as a weight percent.

Further embodiments incorporate a layer of a fluorocarbon composition such as tetrafluoroethylene/hexafluoropropylene/vinylidene fluoride (THV) and blends of THV with other polymers as an extra fire retardant layer. This layer can be included, for example, as an additional layer that is disposed between a layer of glass and a multiple layer glass panel having a polymer sheet with a higher order phosphate ester, as described above. For example, one possible configuration is: glass//polymer sheet//glass//THV//glass.

Particularly useful THV and THV blends that can be used in these embodiments include those disclosed in U.S. Pat. No. 5,908,704. In various embodiments, the fluorocarbon layer comprises at least 75, 80, or 85 weight % of THV polymer. Useful THV polymers and various methods for manufacturing them are described in U.S. Pat. Nos. 3,235,537; 3,132,123; 3,635,926; 3,528,954; 3,642,742; and 4,029,868.

The THV polymers can be block or graft copolymers consisting of an elastomeric soft segment (i.e., hexafluoropropylene and vinylidene fluoride) and a fluroplastic hard segment (i.e., tetrafluoroethylene). The THV polymers are commercially available polymers comprising chloroethylene tetrafluoroethylene copolymer (ECTFE), hexafluoropropylene (HFP), and vinylidene fluoride (VDF) at a molar ratio of, for example, about 42-60:20-18:38-22 of ECTFE:HFP:VDF. Other blends of THV with other fluoropolymers can be used including, but not limited to, THV blended with fluorinated ethylene-propylene copolymers (FEP), perfluoroalkoxy polymer (PFA), perchlorotetrafluoroethylene (PCFE), ethylene-tetrafluoroethylene copolymer (ETFE), polyvinylidine fluoropolymer (PVDF), chloroethylene tetrafluoroethylene, and dichloroethylene tetrafluoroethylene (ECCTFE).

Glass panes of the present invention can be any that are conventionally used in the art of laminated glass panels, and specifically those that incorporate fire resistant properties or that are particularly suited for use with the intumescent layers described above, such as those described in U.S. Pat. No. 5,434,006. Particularly useful glass includes, but is not limited to: tempered glass, borosilicate glass, vitro-ceramic materials, vitro-crystalline materials, aluminosilicate, and alumino-boro-silicate glasses. Examples of compositions of an alumino-silicate and three alumino-boro-silicate gasses that can be used include the compositions listed in the following table (parts by weight):

| Component | Composition A | Composition B | Composition C | Composition D |
|---|---|---|---|---|
| $SiO_2$ | 62.8 | 69.5 | 73.25 | 70 |
| $Al_2O_3$ | 8.4 | 4.0 | 6.2 | 10 |
| $B_2O_3$ | 1.1 | 8.7 | 7.2 | 8 |
| $Na_2O$ | 11.7 | 9.3 | 8.1 | 8 |
| BaO | 2.4 | 5.5 | — | — |
| CaO | — | 3.0 | 3.4 | 3 |
| MgO | 4.4 | — | 1.7 | 1 |
| ZnO | 8.2 | — | — | — |
| $TiO_2$ | 0.6 | — | — | — |
| $As_2O_3$ | 0.4 | — | 0.15 | — |

Multiple layer glass panels of the present invention can generally be oriented with either side of the panel facing an internal space.

The present invention includes windows and windshields incorporating any of the multiple layer glass panels of the present invention.

The present invention further includes a method of manufacturing a polymer sheet of the present invention, comprising forming a polymer sheet having a higher order phosphate ester plasticizer according to one of the techniques described herein.

The present invention further includes methods of manufacturing a multiple layer glass panel by laminating one or more layers of the present invention together with other layers using any appropriate conventional method, such as by an autoclave lamination process to produce any of the multiple layer glazing panels of the present invention.

The present invention also includes a method of preventing or reducing the spread of fire by affixing in an opening any of the multiple layer glass panels of the present invention.

Epoxide Agent

Epoxide agents can be incorporated into the layers of the present invention, and include 3,4-epoxycyclohexane carboxylate compositions of the type described in U.S. Pat. No. 3,723,320. Also useful are diepoxides such as those disclosed in U.S. Pat. No. 4,206,067 that contain two linked cyclohexane groups to each of which is fused an epoxide group. Such diepoxide compounds correspond to the formula:

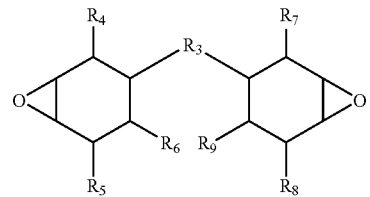

wherein $R_3$ is an organic group containing 1 to 10 carbon atoms, from 0 to 6 oxygen atoms, and from 0 to 6 nitrogen atoms, and $R_4$ through $R_9$ are independently selected from among hydrogen and aliphatic groups containing 1 to 5 carbon atoms. Exemplary diepoxides include 3,4-epoxycyclohexylmethyl-3,4-epoxycyclohexane, bis(3,4-epoxy-6-methylcyclohexylmethyl adipate), and 2-(3,4-epoxycyclohexyl)-5,5-spiro(3,4-epoxy)cyclohexane-m-dioxane.

Other useful epoxide agents include polyglycol di-epoxide agents, such as polymers of epichlorohydrin-polyglycol, for example DER 732. Such high molecular weight di-epoxides are useful because they typically have a relatively low volatility.

Other acid scavengers, alone or in combination with epoxide agents, as are known in the art, can be used in polymer sheets of the present invention.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include; for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer sheet. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030.

Polymer Sheet

The following section describes the various materials, such as poly(vinyl butyral), that can be used to form polymer sheets of the present invention.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, such as acetates, salts, and alcohols. As used herein, "melt" refers to a melted mixture of resin with a plasticizer and optionally other additives.

The polymer sheets of the present invention can comprise any suitable polymer, and, in a preferred embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In one embodiment, the polymer sheet comprises poly(vinyl butyral). In other embodiments, the polymer sheet comprises plasticized poly(vinyl butyral). In further embodiments the polymer sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by known acetalization processes that involve reacting poly(vinyl alcohol) (PVOH) with butyraldehyde in the presence of an acid catalyst, followed by neutralization of the catalyst, separation, stabilization, and drying of the resin.

In various embodiments, the polymer sheet can comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer sheet comprises poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/mole (see, for example, U.S. Pat. Nos. 4,902,464; 4,874,814; 4,814,529; and, 4,654,179). As used herein, the term "molecular weight" means the weight average molecular weight.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate).

Other additives may be incorporated into the polymer sheet to enhance its performance in a final product. Such additives include, but are not limited to dyes, pigments, stabilizers (e.g., ultraviolet stabilizers), antioxidants, antiblock agents, IR absorbers, combinations of the foregoing additives, and the like, as are known in the art.

Any suitable method can be used to produce the polymer sheets of the present invention. Details of suitable processes for making poly(vinyl butyral) are known to those skilled in the art (see, for example, U.S. Pat. Nos. 2,282,057 and 2,282,026).

The poly(vinyl butyral) polymer, plasticizer, and any additives can be thermally processed and configured into sheet form according to methods known to those of ordinary skill in the art. One exemplary method of forming a poly(vinyl butyral) sheet comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In various embodiments, the polymer sheets can have thicknesses of, for example, 0.1 to 2.5 millimeters, 0.2 to 2.0 millimeters, 0.25 to 1.75 millimeters, and 0.3 to 1.5 millimeters.

For each embodiment described above comprising a glass layer, another embodiment exists, where suitable, wherein a glazing type material is used in place of the glass. Examples of such glazing layers include rigid plastics having a high glass transition temperature, for example above 60° C. or 70° C., for example polycarbonates and polyalkyl methacrylates, and specifically those having from 1 to 3 carbon atoms in the alkyl moiety.

Also included in the present invention are stacks or rolls of any of the polymer composition sheets of the present invention disclosed herein in any combination.

The present invention also includes windshields, windows, and other finished glazing products comprising any of the multiple layer constructs of the present invention.

Various polymer sheet and/or laminated glass characteristics and measuring techniques will now be described for use with the present invention.

The clarity of a polymer sheet, and particularly a poly(vinyl butyral) sheet, can be determined by measuring the haze value, which is a quantification of light not transmitted through the sheet. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: Transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness.

By virtue of the present invention, it is now possible to provide multiple layer glass panels having improved fire resistance characteristics. Further, the polymer sheets of the present invention are readily manufactured using existing equipment and techniques, thereby obviating the need to modify equipment.

Although embodiments of the present invention have been described in various embodiments, it will be clear to those of ordinary skill in the art that many other permutations are possible and are within the scope and spirit of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout. For example, a polymer sheet can be formed comprising higher order phosphate esters in any of the ranges given in addition to any of the ranges given for PVOH content, to form many permutations that are within the scope of the present invention.

Any figure reference numbers given within the abstract or any claims are for illustrative purposes only and should not be construed to limit the claimed invention to any one particular embodiment shown in any figure. Figures are not drawn to scale unless otherwise noted.

Each reference, including journal articles, patents, applications, and books, referred to herein is hereby incorporated by reference in its entirety.

I claim:

1. A multiple layer glass panel interlayer, comprising: a polymer sheet comprising a thermoplastic polymer and a polyphosphate ester plasticizer.

2. The interlayer of claim 1, wherein said thermoplastic polymer comprises plasticized poly(vinyl butyral).

3. The interlayer of claim 2, wherein said polymer sheet comprises 5-80 phr of said polyphosphate ester plasticizer.

4. The interlayer of claim 2, wherein said polymer sheet comprises 15-60 phr of said polyphosphate ester plasticizer.

5. The interlayer of claim 2, wherein said polyphosphate ester plasticizer comprises a diphosphate ester.

6. The interlayer of claim 5, wherein said diphosphate ester has the structure:

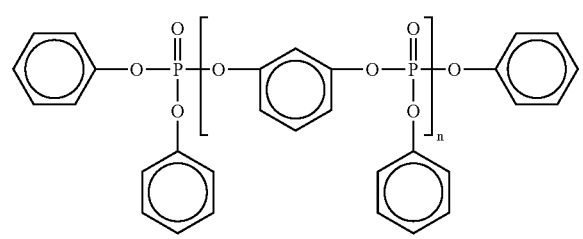

wherein n is 1 to 7.

7. The interlayer of claim 6, wherein said diphosphate ester is resorcinol bis(diphenyl phosphate).

8. The interlayer of claim 2, further comprising a polymer film disposed in contact with said polymer sheet.

9. The interlayer of claim 8, wherein said polymer film comprises poly(ethylene terephthalate).

10. The interlayer of claim 9, further comprising a second polymer sheet disposed in contact with said polymer film.

11. The interlayer of claim 10, wherein said second polymer sheet comprises a polyphosphate ester plasticizer.

12. The interlayer of claim 2, wherein said polymer sheet does not comprise any plasticizer other than said polyphosphate ester plasticizer.

13. The interlayer of claim 2, wherein said polymer sheet further comprises a second plasticizer.

14. The interlayer of claim 13, wherein said second plasticizer comprises a monomeric phosphate ester.

15. The interlayer of claim 14, wherein said monomeric phosphate ester has the formula $R_3PO_4$, wherein R is selected from the group consisting of aryl, alkaryl wherein the alkyl group contains from 1 to 3 carbon atoms, alkyl of from 1 to 12 carbon atoms, alkoxyalkyl of from 1 to 9 carbon atoms and cycloalkyl.

16. A multiple layer glass panel, comprising:

an interlayer, wherein said interlayer comprises a polymer sheet comprising a thermoplastic polymer and a polyphosphate ester plasticizer.

17. The panel of claim 16, wherein said thermoplastic polymer comprises plasticized poly(vinyl butyral).

18. The panel of claim 17, wherein said polymer sheet comprises 5-80 phr of said polyphosphate ester plasticizer.

19. The panel of claim 17, wherein said polymer sheet comprises 15-60 phr of said polyphosphate ester plasticizer.

20. The panel of claim 17, wherein said polyphosphate ester plasticizer comprises a diphosphate ester.

21. The panel of claim 20, wherein said diphosphate ester has the structure:

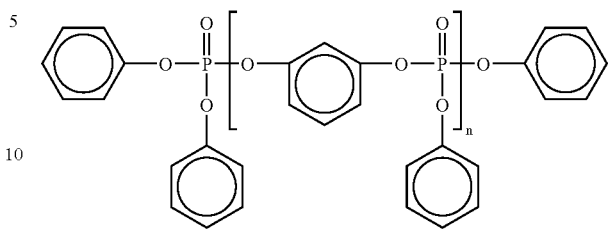

wherein n is 1 to 7.

22. The panel of claim 21, wherein said diphosphate ester is resorcinol bis(diphenyl phosphate).

23. The panel of claim 17, further comprising a polymer film disposed in contact with said polymer sheet.

24. The panel of claim 23, wherein said polymer film comprises poly(ethylene terephthalate).

25. The panel of claim 24, further comprising a second polymer sheet disposed in contact with said polymer film.

26. The panel of claim 25, wherein said second polymer sheet comprises a polyphosphate ester plasticizer.

27. The panel of claim 17, wherein said polymer sheet does not comprise any plasticizer other than said polyphosphate ester plasticizer.

28. The panel of claim 17, wherein said polymer sheet further comprises a second plasticizer.

29. The panel of claim 28, wherein said second plasticizer comprises a monomeric phosphate ester.

30. The panel of claim 29, wherein said monomeric phosphate ester has the formula $R_3PO_4$, wherein R is selected from the group consisting of aryl, alkaryl wherein the alkyl group contains from 1 to 3 carbon atoms, alkyl of from 1 to 12 carbon atoms, alkoxyalkyl of from 1 to 9 carbon atoms and cycloalkyl.

31. A method of manufacturing a multiple layer glass panel interlayer, comprising:

forming a polymer sheet comprising a thermoplastic polymer and a polyphosphate ester plasticizer.

* * * * *